US011980888B2

(12) United States Patent
Lovchik et al.

(10) Patent No.: US 11,980,888 B2
(45) Date of Patent: May 14, 2024

(54) MULTIPLEXED MICROFLUIDIC PROBE INSERT FOR MICROTITER PLATES

(71) Applicant: International Business Machines Corporation, Armonk, NY (US)

(72) Inventors: Robert Dean Lovchik, Schoenenberg (CH); Anna Fomitcheva Khartchenko, Zurich (CH); Iago Pereiro Pereiro, Zurich (CH); Lorenzo Franco Teodoro Petrini, Verscio (CH); Govind Kaigala, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 17/108,089

(22) Filed: Dec. 1, 2020

(65) Prior Publication Data

US 2022/0168730 A1 Jun. 2, 2022

(51) Int. Cl.
*B01L 3/00* (2006.01)

(52) U.S. Cl.
CPC ....... *B01L 3/50855* (2013.01); *B01L 3/50273* (2013.01); *B01L 2200/10* (2013.01); *B01L 2400/049* (2013.01)

(58) Field of Classification Search
CPC ....................... B01L 2200/028; B01L 3/50273
USPC .................................................. 422/504, 521
See application file for complete search history.

(56) References Cited

U.S. PATENT DOCUMENTS

2004/0171169 A1* 9/2004 Kallury .................... G01N 1/34 436/178
2005/0277145 A1 12/2005 Haines et al.
2017/0370951 A1 12/2017 Buffiere et al.
2019/0283022 A1 9/2019 Vahidi et al.

FOREIGN PATENT DOCUMENTS

EP 2511009 A2 10/2012

OTHER PUBLICATIONS

Banks, “Multiplexed Assays in the Life Sciences”, Resources—White Papers, Jun. 2010, BioTek, 12 pages.

* cited by examiner

*Primary Examiner* — Natalia Levkovich
(74) *Attorney, Agent, or Firm* — Mark Bergner

(57) ABSTRACT

A microtiter plate comprising a first array of M×N wells and a microfluidic probe insert is provided. The microfluidic probe insert includes a second array of M×N microfluidic probe conduits, forming N columns of M conduits. The M conduits include respective orifices in a bounding plane and extend, each, perpendicularly to the bounding plane on one side. The microfluidic probe insert also includes N vacuum circuits, each comprising at least one vacuum port and M openings in the bounding plane, where 2≤M, 2≤N. The microfluidic probe insert is positioned on the microtiter plate and the microfluidic probe conduits are inserted in respective wells. A processing liquid is ejected from M conduits via the M orifices of the M conduits by applying a negative pressure to a corresponding set of N vacuum circuits via the respective one or more vacuum ports.

13 Claims, 7 Drawing Sheets

MULTIPLEXED MICROFLUIDIC PROBE INSERT FOR MICROTITER PLATES

BACKGROUND

The invention relates in general to the field of microfluidic probe devices, microfluidic probe systems, and related methods of operation. In particular, it is directed to a multiplexed microfluidic probe insert that can be connected to a microtiter plate, so as to jointly process subset of the wells of the microtiter plate.

Microfluidics deals with the precise control and manipulation of small volumes of fluids. Typically, such volumes are in the sub-milliliter range and are constrained to micrometer-length scale channels. Prominent features of microfluidics originate from the peculiar behavior that liquids exhibit at the micrometer length scale. Flow of liquids in microfluidics is typically laminar Volumes well below one nanoliter can be reached by fabricating structures with lateral dimensions in the micrometer range. Microfluidic devices generally refer to microfabricated devices, which are used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV (ultra-violet) detector, valves, etc.) into one device while minimizing problems related to leaks and evaporation.

Today, the extent of the compatibility of microfluidic probe technology with microtiter plate is limited, especially where hydrodynamic flow confinements of processing liquids are desired.

SUMMARY

According to a first aspect, the present invention is embodied as a microfluidic probe (MFP) insert. The insert comprises an array of M×N MFP conduits, where 2≤M, and 2≤N. The conduits include respective orifices, which are all provided in a same bounding plane. The MFP conduits extend, each, perpendicular to that bounding plane, on one side thereof. The insert further comprises n vacuum circuits, each comprising at least one vacuum port and m openings, wherein such openings are provided in said bounding plane too. The numbers of conduits, vacuum circuits and openings satisfy the following constraints: 2≤M, 2≤N, 1≤n≤M×N/m, and 2≤m≤M×N. Each vacuum circuit of the n vacuum circuits is configured to enable fluid communication between its at least one vacuum port and each of its m openings. Moreover, the insert is configured to enable fluid communication between each of the m openings and a respective one of m orifices of m conduits of said MFP conduits, on another side of the bounding plane, opposite to said one side. Typically, M is larger than or equal to 4, while N is larger than or equal to 6.

The proposed insert is easily fabricated and is further suitable for automation. It can be made compatible with corresponding microtiter plates and standard pipetting robots, to allow fast liquid switching. In addition, the insert does not require complex tubing arrangements, as all vacuum circuits are integrated therein.

In embodiments, the MFP conduits protrude, each, from an average plane of the insert, so as to be insertable in respective wells of a microtiter plate to allow liquid to be transferred from the MFP conduits to the respective wells, in operation of the MFP insert.

Preferably, said each vacuum circuit comprises m vacuum circuit sections, each vacuum circuit section of said m vacuum circuit sections surrounds, at least partly, a respective conduit of the m conduits on said one side of the bounding plane and extends along said respective conduit up to a respective opening of the m openings of said each vacuum circuit, and said respective opening surrounds, at least partly, a respective orifice of the respective conduit, so as to allow fluid communication between said respective orifice and said respective opening on said another side of the bounding plane.

The insert may advantageously be structured so as to ensure a minimal gap between said bounding plane and bottom walls of the wells of the microtiter plate, in operation, thereby allowing fluid communication between said respective orifice and said opening.

Preferably, the array of MFP conduits forms a rectangular arrangement of M rows×N columns of conduits, where n=N, and m=M. In addition, each vacuum circuit is associated with a respective one of the N columns of conduits, so as to enable fluid communication between its at least one vacuum port and each of its M openings, wherein each of said M openings is in fluid communication with a respective one of the M orifices of the M conduits of said respective one of the N columns of conduits.

In embodiments, the MFP insert further includes an array of M×N reservoirs. Each reservoir extends on said one side of the bounding plane and is in fluid communication with a respective one of the M vacuum circuit sections of one of the N vacuum circuits, so as to be able to receive liquid aspirated via said respective one of the M vacuum circuit sections, in operation.

The insert can advantageously include two parts (e.g., injection-molded), i.e., an upper part and a lower part that are assembled in a leak-free manner. The upper part is structured so as to form inner walls of each of the MFP conduits, while the lower part is structured so as to form bounding walls for each of the vacuum circuit sections and inner walls of each of the reservoirs. Each vacuum circuit section is formed by a residual gap provided between the two parts at a level of each conduit.

Each vacuum circuit may possibly comprise at least two vacuum ports, each in fluid communication with said respective set of m orifices.

According to another aspect, the invention is embodied as an MFP system. The system includes a microtiter plate and an insert with an array of M×N MFP conduits, such as described above. The microtiter plate comprises an array of at least M×N wells. The MFP conduits protrude, each, from an average plane of the insert, so as to be insertable in respective wells of the microtiter plate, in operation.

In preferred embodiments, each vacuum circuit comprises M vacuum circuit sections, each surrounding, at least partly, a respective conduit of the M conduits on said one side of the bounding plane. In addition, each vacuum circuit extends along a respective conduit up to a respective opening, wherein the latter surrounds, at least partly, an orifice of a respective conduit. This way, fluid communication can be obtained between such an orifice and a respective opening on the other side of the bounding plane, i.e., in a processing region defined between the bounding plane and a bottom wall of a respective well.

Advantageously, the MFP insert and the microtiter plate may be jointly configured to form M×N overflow circuit sections upon inserting the MFP conduits into said respective wells. Each of the overflow circuit sections is bounded by a portion of a lower part of the insert. A portion of an upper surface of the microtiter plate, surrounds, at least partly, a respective vacuum circuit section. Each overflow circuit section extends on said one side of the bounding plane up to a respective opening on the bounding plane. This additional opening surrounds, at least partly, an opening of a vacuum circuit section. Such a design enables fluid communication between an overflow circuit section and a corresponding vacuum circuit section in said processing region. In addition, the MFP insert further includes M×N bypass channels, each connecting an MFP conduits to the corresponding overflow circuit section through the corresponding vacuum circuit section.

In embodiments, the microfluidic probe insert further includes an array of M×N reservoirs, and each reservoir of the M×N reservoirs extends on said one side of the bounding plane and is in fluid communication with a respective one of the M vacuum circuit sections of one of the N vacuum circuits, so as to be able to receive liquid aspirated via said respective one of the M vacuum circuit sections, in operation.

Preferably, said wells are first wells and the microtiter plate further comprises an additional array of M×N second wells, the second wells interlaced with the first wells, so as for the microtiter plate to form an array of M×2N wells. Said each reservoir protrudes from an average plane of the insert, so as to be insertable in the second wells of the microtiter plate, in operation.

According to a final aspect, the invention can be embodied as a method of operating an MFP system such as described above. That is, the method first comprises providing: a microtiter plate comprising a first array of at least M×N wells; and a microfluidic probe insert including a second array of M×N microfluidic probe conduits, the second array forming N columns of M conduits of the microfluidic probe conduits, the conduits including respective orifices in a same bounding plane and extending, each, perpendicular to that bounding plane on one side thereof, and N vacuum circuits, each comprising at least one vacuum port and M openings in said bounding plane, where 2≤M, 2≤N. Then, the MFP insert is positioned on the microtiter plate and the MFP conduits are inserted in respective ones of the wells. A processing liquid is ejected from M conduits of a selected column by applying a negative pressure to the corresponding vacuum circuit.

In embodiments, the microfluidic probe insert and the microtiter plate provided are jointly configured to form M×N overflow circuit sections upon inserting the microfluidic probe conduits into said respective wells, wherein each of the overflow circuit sections is bounded by a portion of the insert and an opposite portion of an upper surface of the microtiter plate. There, the method may further comprise, prior to ejecting said processing liquid, filling the M conduits with immersion liquid, for the latter to: flow through respective orifices of the M conduits and fill corresponding processing regions in corresponding wells of the microtiter plate; and flow through bypass channels connecting the MFP conduits to corresponding ones of the overflow circuit sections, for the liquid to fill said overflow circuit sections. Thus, the processing liquid can be ejected from said M conduits by injecting processing liquid in the conduits while aspirating some of the immersion liquid that has filled said corresponding processing regions (upon applying said negative pressure). Interestingly, thanks to the proposed design of the microfluidic probe insert and the microtiter plate, the processing liquid can be ejected so as to be hydrodynamically confined in immersion liquid in the processing regions.

In embodiments, the microfluidic probe insert provided further includes an array of M×N reservoirs, each in fluid communication with a respective one of the M vacuum circuit sections of one of the N vacuum circuits. This way, aspirating some of the immersion liquid causes to fill M of said reservoirs.

Preferably, said wells include M×N first wells and M×N second wells, wherein the second wells are interlaced with the first wells, so as for the first array to include M×2N wells. In that case, the microfluidic probe insert is positioned on the microtiter plate to insert the microfluidic probe conduits in the first wells and insert the reservoirs in the second wells.

Microfluidic probe inserts, MFP systems, and methods of operating such systems embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1A:
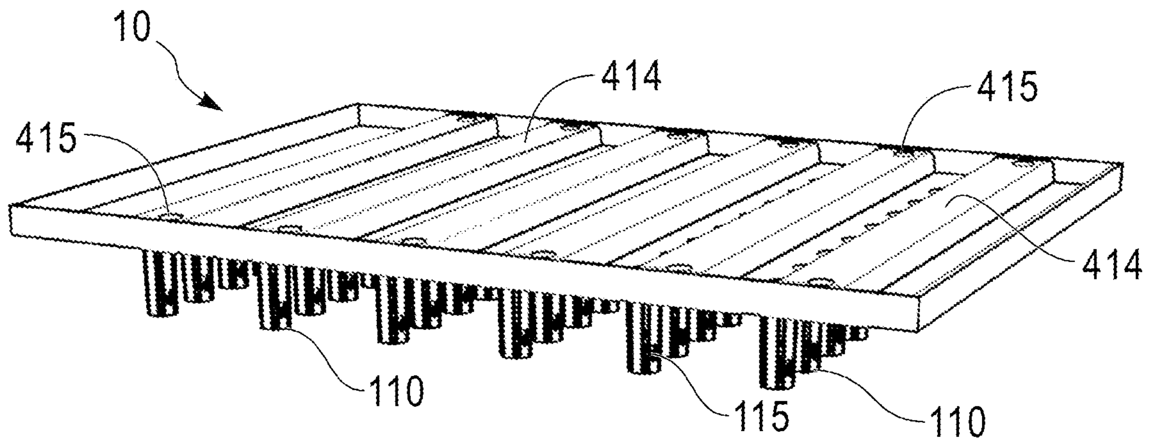
FIGS. 1A, 1B and 1C show an exploded, 3D view of MFP system according to embodiments, wherein the system includes an upper part (FIG. 1A) and a lower part (FIG. 1B) that can be assembled to form an MFP insert, see FIG. 2A, which can itself be paired with a microtiter plate (FIG. 1C)

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

The following description is structured as follows. First, general embodiments and high-level variants are described (sect. 1). The next section addresses more specific embodiments and technical implementation details (sect. 2). All references Sij refer to methods steps of the flowchart of FIG. 8, while numeral references pertain to physical parts or components of the MFP inserts and systems shown in FIGS. 1, 2, and 4-7.

1. General Embodiments and High-Level Variants

In reference to FIGS. 1A, 1B, and 2A to 7C, a first aspect of the invention is described, which concerns a multiplexed MFP insert 10, 20. This insert can advantageously be used jointly with a microtiter plate 30 to form a system, as described later in reference to a second aspect of the invention. Such a system can be operated according to methods as described, in fine, in reference to a third and final aspect of the invention.

The insert 10, 20 comprises an array of M×N MFP conduits 110 and a vacuum system, where the system comprises n vacuum circuits 410-415. The MFP conduits 110 are hereafter referred to as "conduits," to ease the exposition. Each conduit delimits a cavity, e.g., a chamber, which is terminated by an orifice 111, where the latter may be provided in a liquid ejection port 250*a*, as in embodiments. In variants, the orifice 111 is formed in a bottom wall 250 of the conduit. That is, the conduits 110 include respective orifices 111 (see FIGS. 5, 7A, and 7C), and all of said orifices 111 are bounded by a same plane $P_B$, hereafter referred to as the "bounding plane," or simply the "plane $P_B$." That is, the orifices are all formed at the level of the plane $P_B$. Note, this plane is not necessarily materialized by a solid component of the insert (though it may be); it primarily refers to a plane, at the level of which the orifices are formed.

The conduits extend, each, perpendicular to this bounding plane $P_B$, on one side thereof, e.g., the upper side of the plane in the accompanying drawing, as assumed in the following. In other words, the main direction of extension of the conduit is perpendicular to the plane $P_B$.

The insert 10, 20 further includes n vacuum circuits 410-415. Each vacuum circuit comprises at least one vacuum port 415, as well as m openings 411, hereafter referred to as first openings, for reasons that will become apparent later. Like the orifices 111, the first openings 411 are all formed at the level of the bounding plane $P_B$. Each vacuum circuit 410-415 is configured to enable fluid communication between each of its m openings 411 and its vacuum port(s) 415.

Moreover, the insert 10, 20 is configured to enable fluid communication between each of the m openings 411 (of each vacuum circuit) and a respective orifice 111. Thus, the m openings 411 connect to m orifices 111, respectively. Such orifices 111 belong to (or are otherwise defined at an end of) of m respective conduits 110. Note, fluid communication between the m openings 411 and the m orifices 111 is enabled on the other side of the bounding plane $P_B$, e.g., opposite to said one side. This "other side" corresponds to the lower side of the plane $P_B$ in the accompanying drawings, as assumed in the following.

Accordingly, liquid can be aspirated through the vacuum circuits 410-415 to help in ejecting liquid via the orifices 111, which can be achieved by applying a negative pressure in the vacuum circuits via their respective port(s) 415, as explained later in detail in reference to other aspects of the invention. Owing to the distributive structure of the vacuum circuits (which typically include a distribution channel 414 branching to multiple sections 410, 412, the insert 10, 20 can be regarded as having a multiplexed architecture.

In the above definition of the insert, each of the numbers M and N must be larger than or equal to 2, i.e., 2≤M, and 2≤N, so as to effectively form an array of M×N conduits 110. In practice, however, M is preferably larger than or equal to 4 (e.g., M=8), while N is preferably larger than or equal to 6 (e.g., N=12). The insert designs shown in FIGS. 1 and 2 assumes an array of 6 columns of 8 conduits each, although 12 columns of tubular parts 210, 212 (also referred to as "second tubular sections 210, 212") are visible, for reasons that will become apparent later. The array of conduits 110 preferably form a rectangular arrangement (as seen in a plane parallel to said plane $P_B$, see, e.g., FIG. 4) of conduits. That is, the conduits are preferably arranged in N columns of M conduits each.

The multiplexed structure of the insert 10, 20 further reflects in that m and n are subject to the following constraints: 1≤n≤M×N/m, and 2≤m≤M×N. That is, there is at least one vacuum circuit (1≤n), where each circuit comprises at least 2 openings 411 (2≤m). And because each vacuum circuit comprises at least 2 openings 411, there are at most M×N/2 such vacuum circuits (n≤M×N/m). The number m of openings 411 cannot exceed M×N, which corresponds to the total number of conduits (and associated orifices 111); m may be equal to M×N when a single vacuum circuit is involved for the whole array of conduits.

Note, each vacuum circuit may nevertheless lead to a larger number openings 411. So, in general, each vacuum circuit may possibly lead to m sets of one or more openings, the goal being to achieve fluidic communication between a set of one or more openings 411 and a respective orifice 111, for each conduit 110.

To summarize, in the most general case, at least one vacuum circuit is involved in the insert, which circuit leads to at least m openings 411, the latter communicating with respective orifices 111 of the conduits 110. However, since microtiter plates are preferably operated one column at a time, n and m shall preferably be equal to N and M, respectively, as in preferred embodiments discussed later.

The proposed insert 10, 20 is easily fabricated and is further suitable for automation. It can be made compatible with corresponding microtiter plates and standard pipetting robots, to allow fast liquid switching. In addition, the insert does not require complex tubing arrangements, as all vacuum circuits are integrated therein. In embodiments, the insert can be fabricated as a two-part, injection-molded device, capable of generating hydrodynamic flow confinements in every row of conduits. The insert is typically disposable, may include integrated waste reservoirs 212, and be designed for direct signal read-out, thanks to a transparent lid 10 (also referred to as "upper part 10").

Figure 4:
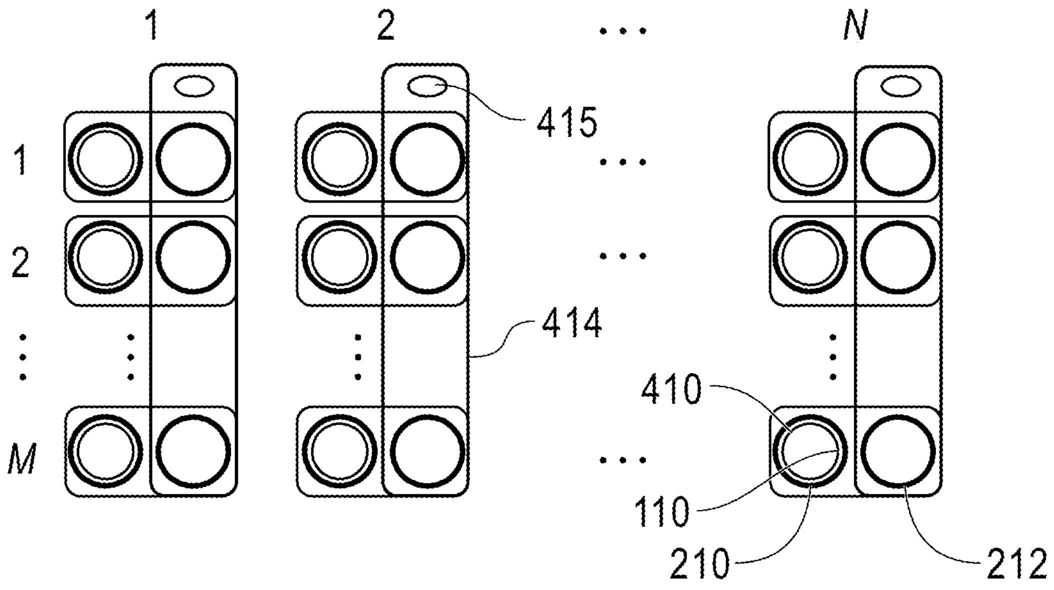
FIG. 4 schematically depicts a top view of selected components of an MFP insert, comprising an array of M×N MFP conduits, nested in an array of M×N waste reservoirs, where each reservoir connects to a respective conduit via a vacuum circuit section, as in embodiments.

All this is now described in detail, in reference to particular embodiments of the invention. To start with, any vacuum circuit may possibly comprise two or more ports 415, where each port is in fluid communication with the m orifices 111 of this circuit. In that case, the vacuum ports 415 are preferably distributed, e.g., along a distribution channel 414, so as to minimize under-pressure gradients in the vacuum circuit. Note, only one port 415 per distribution channel 414 is shown in FIG. 4, for depiction purposes.

The MFP conduits 110 preferably protrude, each, from an average plane $P_A$ of the insert 10, 20, so as to easily pair the insert with a microtiter plate 30. Namely, the protruding conduits can be inserted in respective wells 310 of the microtiter plate 30. This allows liquid to be transferred from the MFP conduits 110 to the wells 310, in operation. Note, a microtiter plate is sometimes referred to as a microplate, a microwell plate, or a multiwell.

As seen in FIGS. 5-7C, each vacuum circuit 410-415 may notably comprise a vacuum circuit section 410, which surrounds (at least partly) a respective conduit 110, on the upper side of the bounding plane $P_B$. E.g., each vacuum circuit may include m circuit sections 410, each surrounding, at least partly, a respective conduit of the m conduits 110. In addition, each vacuum circuit section 410 extends along its respective conduit 110 up to (or, in fact, down to) its respective opening 411. The latter may surround, at least partly, a respective orifice 111 of the conduit 110, so as to allow fluid communication between this orifice 111 and the opening 411. Again, fluid communication is enabled on the lower side of the bounding plane $P_B$.

Figure 5:
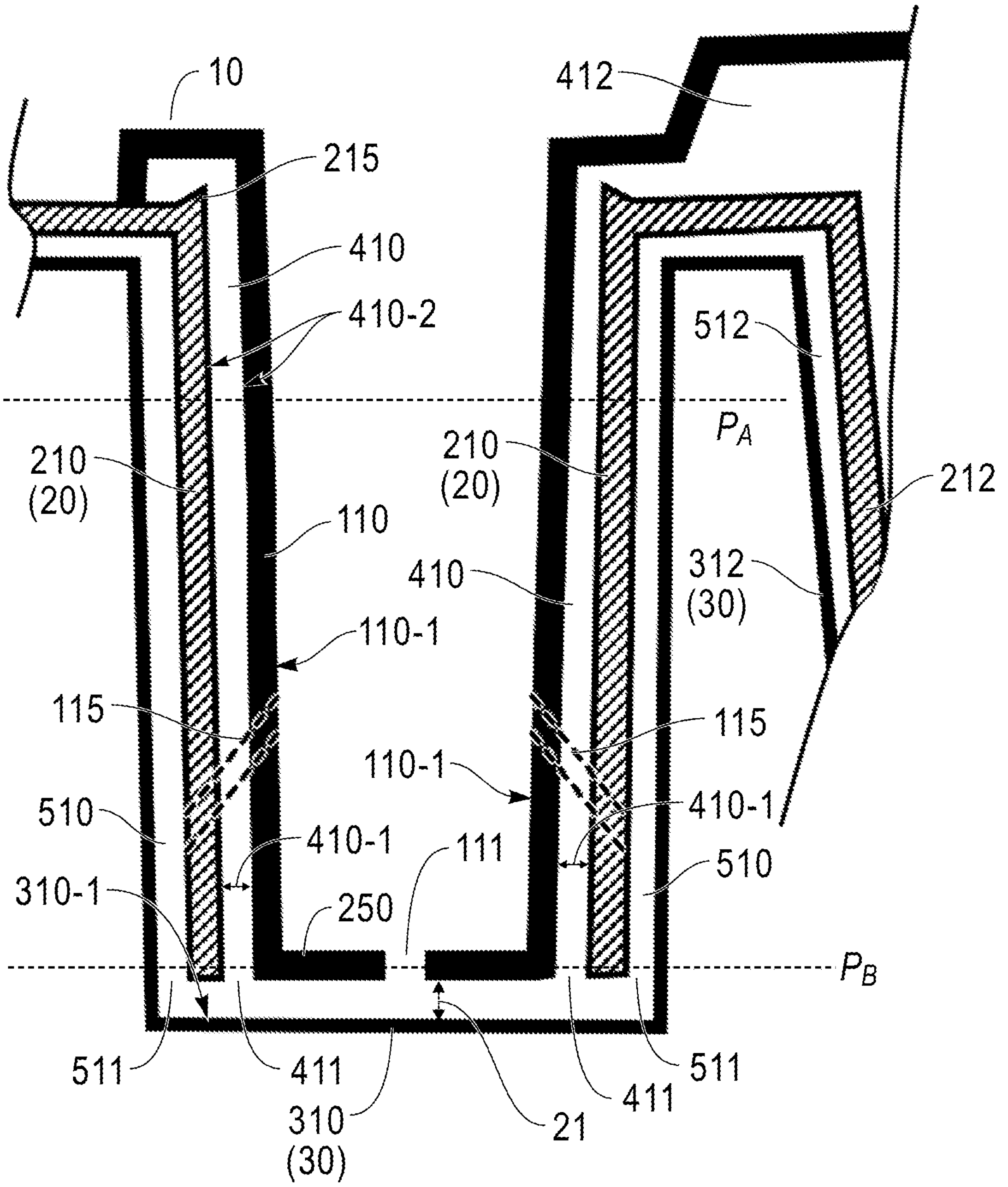
FIG. 5 is a 2D cross-sectional view of a portion of an MFP system, after assembly, showing an MFP conduit of an upper part of an MFP insert, where the conduit is surrounded by a tubular part of a lower part of the insert to form a vacuum circuit section, and the conduit and the tubular part are both inserted in a corresponding well of a microtiter plate, as in embodiments.

As best seen in FIG. 5, the insert 10, 20 is preferably structured so as to ensure a minimal gap 21 between the orifices 111 (and openings 411) at the level of the bounding plane $P_B$ and the bottom walls 310-1 of the wells 310 of the microtiter plate 30, in operation. This way, a processing region is defined (between the bounding plane $P_B$ and the bottom wall of each well 310). Thanks to this processing region, fluid can notably pass from the inner chamber of the conduit 110 to the vacuum section 410, via the orifice 111 and the neighboring opening 411, wherein the latter is circular in the example of FIG. 5. For example, each conduit may include a bottom wall 250 (as in the example of FIG. 5) or be closed by a snap-fit part 250*a* (e.g., a liquid ejection port, see FIGS. 7A and 7C), in which a respective orifice 111 is formed. The bottom elements 250, 250*a* may notably have one or more posts 218 (see FIGS. 7B and 7C), or some spacers, each protruding downwardly from an element 250, 250*a*, e.g., on the lower side of the bounding plane $P_B$, so as to contact a bottom wall 310-1 of a respective well 310 and thereby ensure a minimal gap 21 between the bounding plane $P_B$ and the well 310, in operation.

The array of conduits 110 preferably form a rectangular arrangement of M rows×N columns of conduits 110. In addition, the number n of vacuum circuit is preferably equal to the number N of columns, and the number m of openings preferably corresponds to the number M of conduits per column, to allow a column-wise automation, as in embodiments. In that case, each vacuum circuit 410-415 is associated with a respective one of the N columns of conduits 110, to enable fluid communication between its at vacuum port(s) 415 and each of its M openings 411. Moreover, each of the M openings 411 is in fluid communication with a respective one of the M orifices 111 of the M conduits 110 of one of the N columns.

The MFP insert 10, 20 may advantageously include an array of M×N reservoirs 212, see FIGS. 1, 2, 4, 5 and 7. Each reservoir 212 extends on the upper side of the bounding plane $P_B$ and is in fluid communication with a respective vacuum circuit sections 410, see FIG. 5. Accordingly, each reservoir may be able to receive liquid aspirated via this vacuum circuit sections 410, in operation.

Figure 3:
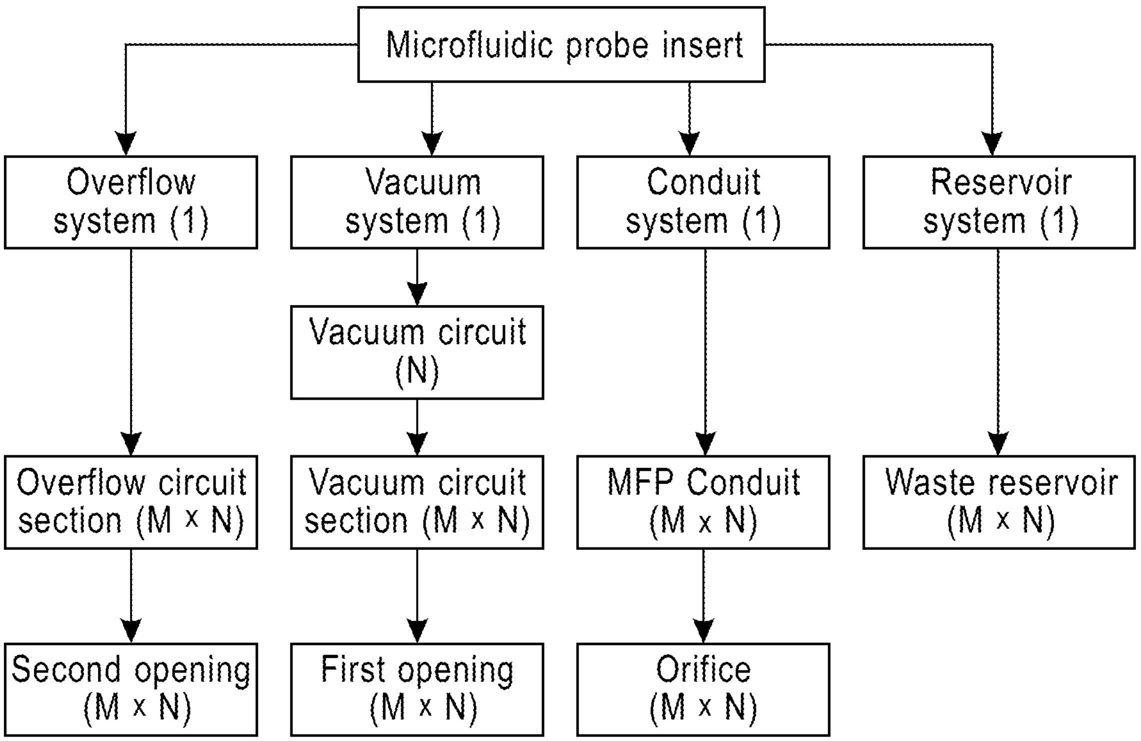
FIG. 3 is a hierarchical diagram that illustrates relationships between selected components of an MFP system according to embodiments.

Note, the "vacuum" distribution is preferably ensured via distribution channels 414 extending, each, on top of a respective column of reservoirs 212, as best seen in FIG. 1, 2, or 3. Each distribution channel 414 communicates with a respective set of M sections 410, at the level of upper sections 412 (see "aspiration channels 412" of FIG. 5).

Figure 1B:
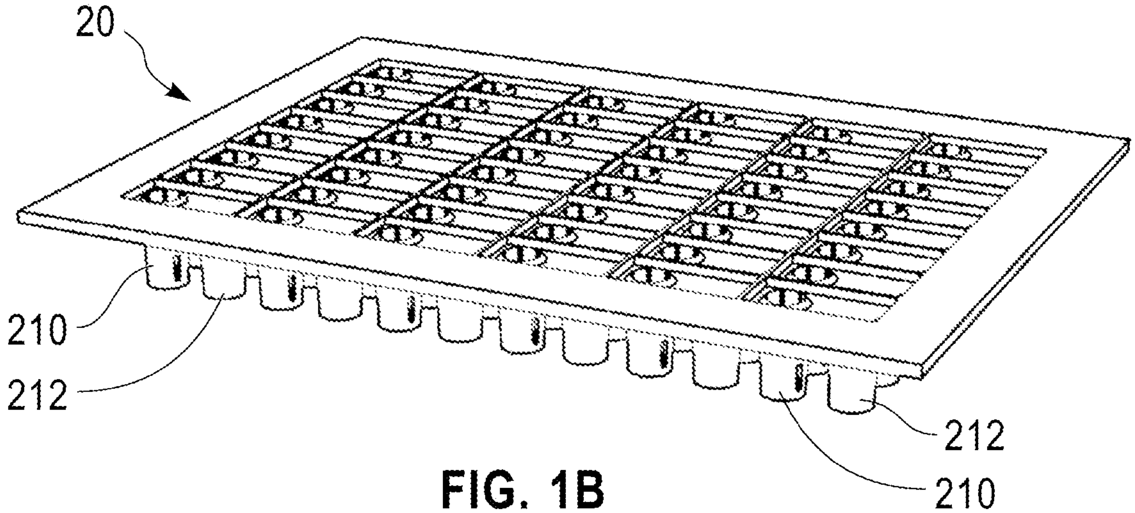
Figure 1C:
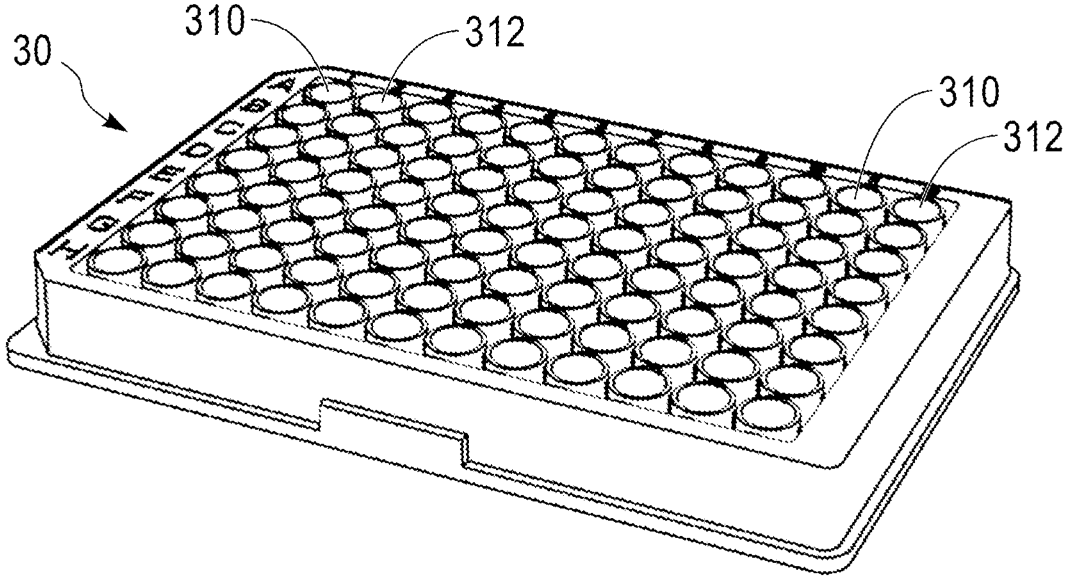
Figure 2A:
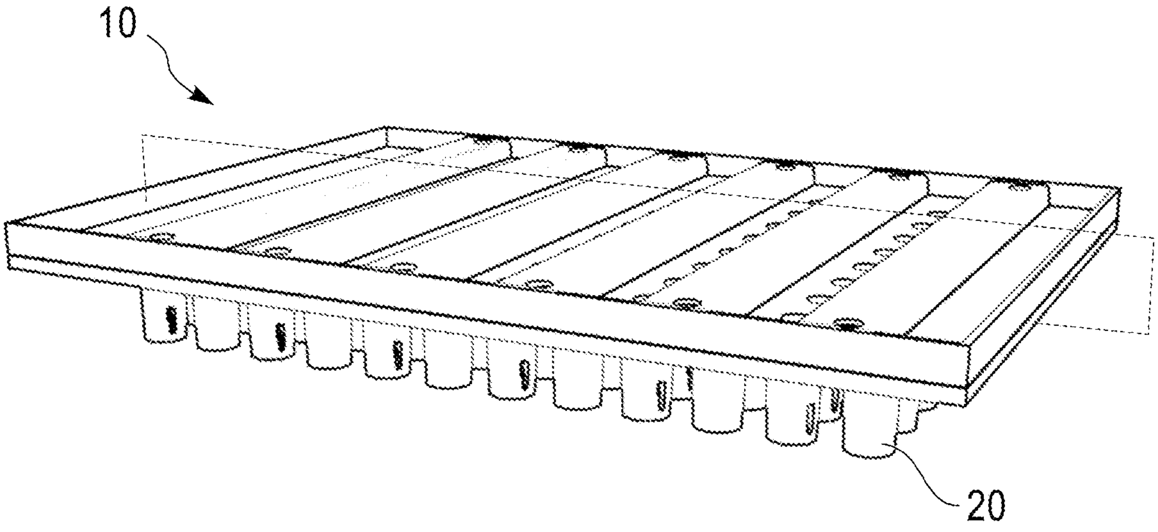
FIG. 2A is a 3D view of the upper part and the lower part of the MFP insert of FIGS. 1A and 1B, once assembled, as in embodiments.
Figure 2B:
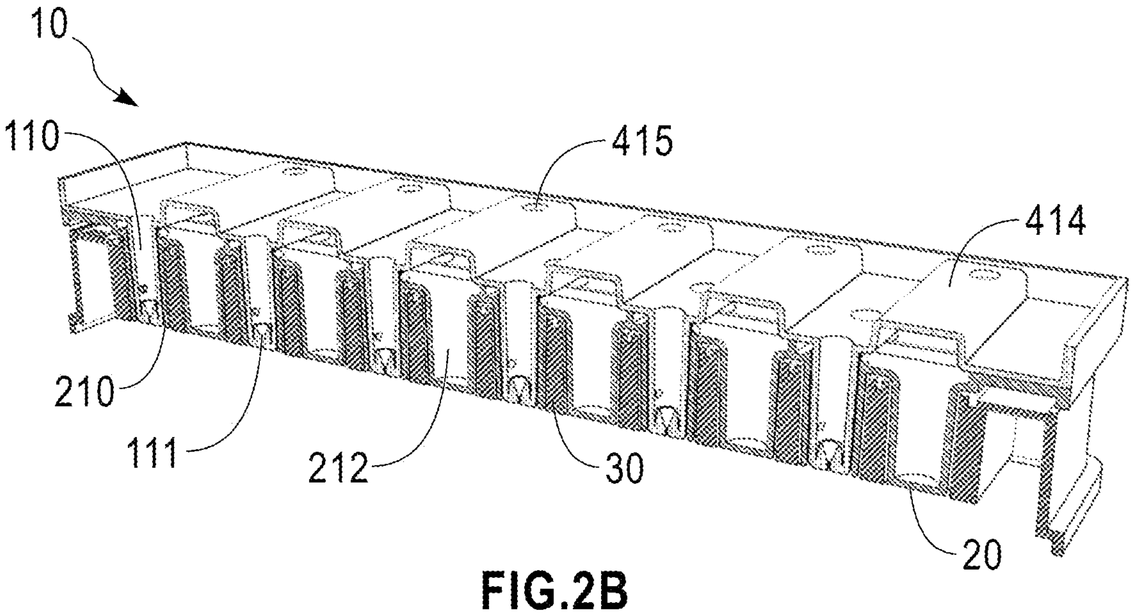
FIG. 2B shows a cross-section of the MFP insert of FIG. 2A, once inserted on a microtiter plate as shown in FIG. 1C, where the plane upon which the sectional view is taken is indicated by a broken line in FIG. 2A.

The insert 10, 20 preferably comprises two parts 10, 20 (e.g., multiplexed MFP insert 10, 20—see FIGS. 1A and 1B, which are assembled in a leak-free manner (FIG. 2A)). The two parts 10, 20 include an upper part 10 (FIG. 1A) and a lower part 20 (FIG. 1B). The upper part 10 is notably structured so as to form first tubular sections, which, themselves, form inner walls 110-1 of each of the conduits 110, while the lower part 20 may be structured so as to form second tubular sections 210, 212, see FIGS. 1B and 2A. One column of the second tubular sections 210 cap respective conduits 110 and form bounding walls 410-2 for the corresponding vacuum circuit sections 410, while the neighboring column of second tubular sections 210 form inner walls of each of the reservoirs 212. In other words, each vacuum circuit section 410 can be formed by a residual gap 410-1 provided between the two parts 10, 20 at a level of each of the MFP conduits 110. E.g., each vacuum circuit section 410 is bounded by local sections of each of the two parts 10, 20.

Each of the two parts 10, 20 can advantageously be fabricated as an injection-molded part. To that aim, the conduits 110 and the surrounding walls may need to be slightly slanted (e.g., by 1-2 degrees with respect to the main direction of the conduits), hence the truncated conic shapes seen in the accompanying drawings. For the same reasons, some features, e.g., channels 115, of the conduits may need to be slanted, too.

Referring to FIGS. 1 and 5, another aspect of the invention is now described, which concerns an MFP system 10-30.

The system comprises an MFP insert 10, 20 such as described earlier in reference to the first aspect of the invention. The insert 10, 20 notably comprises an array of M×N MFP conduits 110, where the conduits include respective orifices 111 in the bounding plane $P_B$ and extend, each, perpendicular to this bounding plane on the upper side thereof. As explained earlier, the insert may further include N vacuum circuits 410-415, each comprising at least one vacuum port 415 and M openings 411 in the bounding plane $P_B$, where $2 \leq M$, and $2 \leq N$. Fluid communication is enabled, on the one hand, between each vacuum port 415 and each of the M openings 411 of each of the N vacuum circuits, and, on the other hand, between each of the M openings 411 and a respective orifice 111 of a respective conduit 110 (on the lower side of the plane $P_B$).

In addition, the system 10-30 comprises a microtiter plate 30. The plate includes or forms an array of at least M×N wells 310. It may advantageously include an additional array of wells, to form reservoirs 212, as discussed later. The MFP conduits 110 protrude, each, from the average plane $P_A$ of the insert 10, 20. This way, they can be inserted in respective wells 310 of the microtiter plate 30, in operation of the system.

In embodiments, each vacuum circuit 410-415 comprises M vacuum circuit sections 410, each surrounding, at least partly, a respective conduit 110 on the upper side of the plane $P_B$. Each vacuum circuit section extends along a respective conduit up to (or down to) a respective opening 411. M vacuum circuit sections 410 lead to M openings 411, respectively.

Each opening 411 surrounds, at least partly, a respective orifice 111 of a respective conduit. The openings 411 may have a circular (or partly circular) shape in that case. Such a configuration allows fluid communication to be achieved between an orifice 111 and an associated opening 411, on the lower side of the plane $P_B$, the latter delimiting a processing region defined between the plane $P_B$ and the bottom wall of the well 310 into which a corresponding conduit 110 is inserted, see FIG. 5.

In particularly preferred embodiments, the system includes an additional fluid circuit system. More precisely, the insert 10, 20 and the microtiter plate 30 may be jointly configured to form liquid overflow circuit sections 510, after having inserted the conduits 110 into the respective microtiter wells 310, see FIG. 5. Each overflow circuit section 510 is bounded, on the one hand, by second tubular section(s) 210 of a lower part 20 of the insert 10, 20 and, on the other hand, by a respective microtiter well 310 of an upper surface of the microtiter plate 30, as seen in FIG. 5.

In addition, each overflow circuit section 510 surrounds, at least partly, a respective vacuum circuit section 410 of a given vacuum circuit. The vacuum circuit sections 410 lead to respective openings 411, also referred to as "first openings" to distinguish them from openings 511 (the "second openings") that form part of the overflow circuit sections.

Namely, each overflow circuit section extends on the upper side of the bounding plane $P_B$, down to a second opening 511, also formed at the level of the bounding plane $P_B$. This second opening 511 surrounds, at least partly, a respective one of the first openings 411, thereby enabling fluid communication therewith in the processing region defined between the bounding plane $P_B$ the bottom well of the microtiter plate.

The MFP insert 10, 20 may further include a set of k×(M×N) bypass channels 115, where k is larger than or equal to 1. In other words, the insert includes at least M×N bypass channels, e.g., at least one bypass channel 115 for each conduit 110. Each bypass channel 115 connects one of the M×N conduits 110 to a respective liquid overflow circuit section 510 and, this, through a respective vacuum circuit section 410, as the dashed lines 115 in FIG. 5 suggest. Such bypass channels 115 may notably allow the system to be operated as illustrated in FIGS. 6A-6D, as described later in reference to a final aspect of the invention. To that aim, the bypass channels 115 should be sufficiently close to the bounding plane $P_B$. Because the insert parts 10, 20 are preferably fabricated thanks to an injection molding process, such bypass channels will likely have to be at an angle (e.g., 1-2 degrees) with respect to the main direction of the conduits 110, as noted earlier.

In embodiments, the insert 10, 20 of the system 10-30 further includes an array of M×N reservoirs 212, as described earlier. Such reservoirs can be regarded as waste reservoirs. Each reservoir 212 extends on the upper side of the bounding plane and is in fluid communication with a respective vacuum circuit section 410, so as to be able to receive liquid aspirated via this vacuum circuit sections 410, in operation.

Advantageously, such reservoirs 212 may be inserted in respective wells 312 of the microtiter plate 30, just like the conduits 110 are inserted in the wells 310. To that aim, each reservoir 212 may protrude from the average plane $P_A$ of the insert 10, 20, so as to be inserted into the second wells 312, in operation of the system. In other words, the microtiter plate 30 may comprise an additional array of M×N wells 312 (call them the "second wells"), in addition to the first wells 310. The array of second wells 312 can be interlaced (e.g., interwoven) with the array of first wells 310, so as for the microtiter plate to form an array of M×2N wells, see FIG. 1C.

To summarize, as depicted in the hierarchical diagram of FIG. 3, embodiments of the present systems 10-30 may involve:

- An array of M×N conduits 110, each leading to a respective orifice 111 (there are thus M×N such orifices);
- A corresponding array of M×N reservoirs 212, interlaced with the array of M×N conduits 110;
- A vacuum system with N vacuum circuit section(s) 410, each leading to M first openings 411 (there are thus M×N first openings), via M circuit sections 410, where each section 410 surrounds a respective conduit 110 and connects to an associated reservoir 212, e.g., via an upper section 412 in a distribution channel 414; and
- An overflow system with M×N overflow circuit sections 510, each leading to a respective second opening 511 (there are thus M×N second openings), where each overflow circuit section 510 surrounds a respective vacuum circuit section 410, hence the coaxial sandwich structure 110-210-410-510-310 shown in FIG. 5.

The orifice 111 and the openings 411, 511 are all formed at the level of the bounding plane $P_B$, thereby allowing fluid exchanges between any pair of such apertures, in the processing region defined below the bounding plane $P_B$.

Note, the sandwich structure is essentially duplicated from one conduit 110 to a neighboring reservoir 212. Thus, pairs of neighboring sandwich structures are obtained, one being formed by elements 110-210-410-510-310, the neighboring one by elements 212-512-312, where 512 denotes a gap between the tubular section 212 and the corresponding well 312, as seen in FIG. 5.

Figure 8:
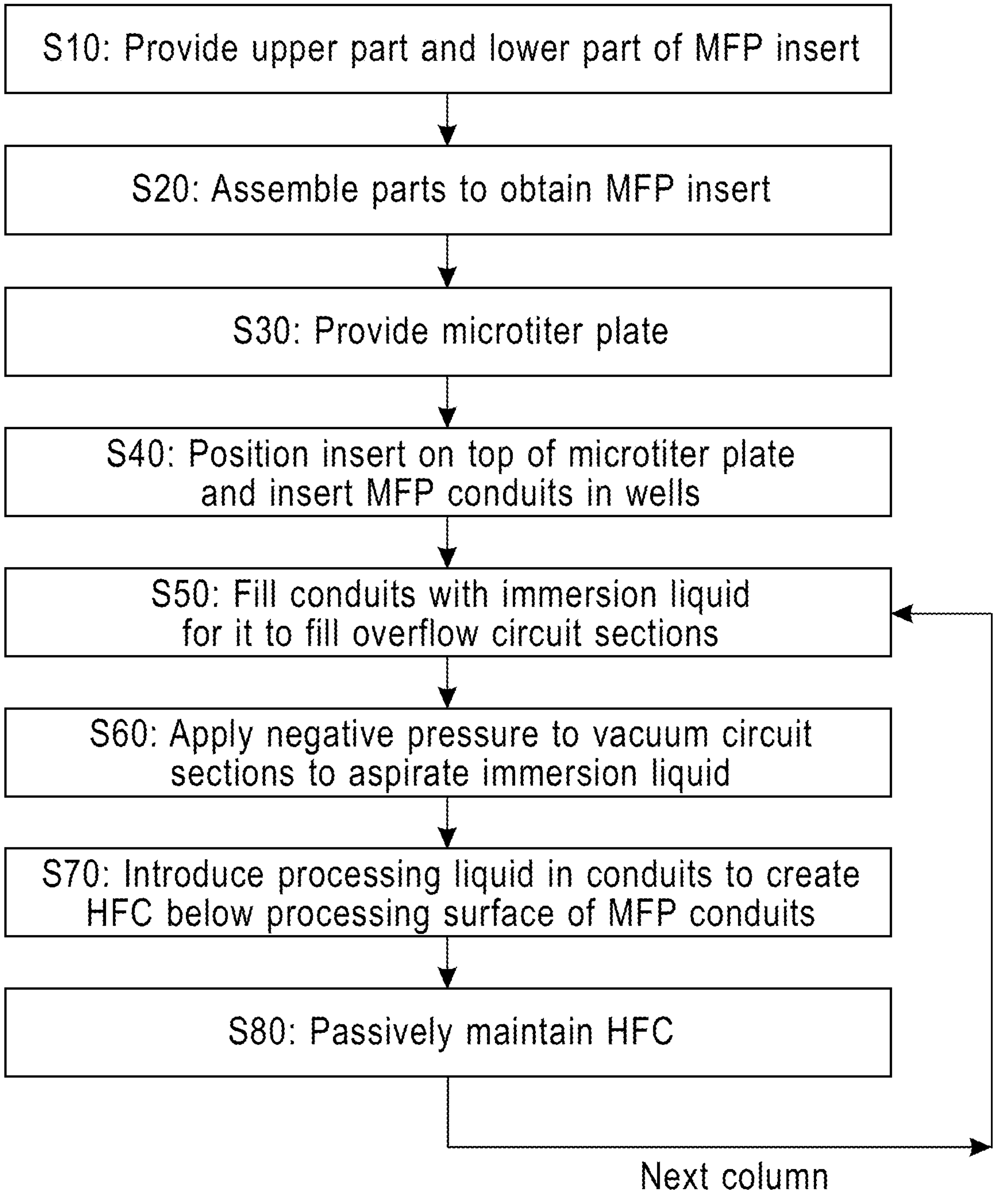
FIG. 8 is a flowchart illustrating high-level steps of a method of operating an MFP system such as shown in FIGS. 1A-1C, according to embodiments.

Referring primarily to FIGS. 6 and 8, a final aspect of the invention is now described, which concerns a method of operating an MFP system 10-30 such as described above.

First, an MFP insert 10, 20 is provided S10-S20, together S30 with a microtiter plate 30. The insert may already be assembled and ready for use. If not, the user may need to assemble S20 the two parts 10, 20 and weld them (or glue them), should a leak-free assembly be needed.

The MFP insert 10, 20 is then positioned S40 on the microtiter plate 30, and the MFP conduits 110 are inserted S40 in respective wells 310 of the plate 30.

The system 10-30 is operated so as to eject S50-S70 a processing liquid from M conduits of a selected column via the M orifices 111 of the M conduits 110. This is achieved by applying S60 a negative pressure (i.e., an under-pressure or suction) to a corresponding vacuum circuit 410-415 via its vacuum port(s) 415. The negative pressure applied S60 causes to aspirate liquid from the section 410, which, in turn, causes (or helps) to eject liquid from the orifices 111.

In embodiments, the insert 10, 20 and the microtiter plate 30 are jointly configured to form liquid overflow circuit sections, as described earlier. Liquid overflow circuit sections can advantageously be operationalized to obtain a hydrodynamic flow confinement (HFC) of the ejected liquid, as discussed now in reference to FIGS. 6A-6D.

Figure 6A:
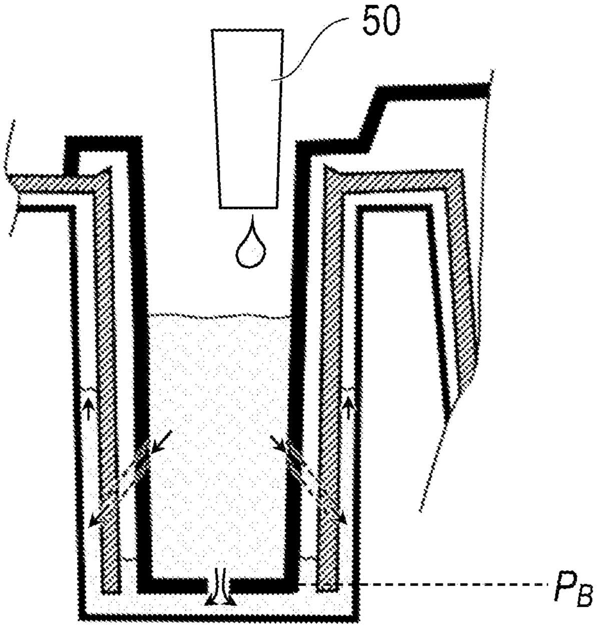
FIGS. 6A, 6B, 6C and 6D is a sequence illustrating high-level steps of operation of an MFP system, using cross-sectional views similar to that of FIG. 5, to obtain a hydrodynamic flow confinement of a processing liquid, according to embodiments.

First, M conduits 110 of a given column may be filled S50 with immersion liquid, e.g., using pipettes 50 (preferably by way of an automated process, involving robots), as depicted in FIG. 6A. This causes the deposited immersion liquid to flow through orifices 111 of the conduits 110 and fill corresponding processing regions in corresponding wells 310 of the microtiter plate 30, as represented by arrows in FIG. 6A. Note, the numeral references corresponding to elements shown in FIGS. 6A-6B only appear in FIG. 5, for clarity.

Moreover, immersion liquid can flow through the bypass channels 115 connecting the conduits 110 to the corresponding overflow circuit sections 510. As a result, immersion liquid progressively fills the overflow circuit sections 510.

Figure 6B:
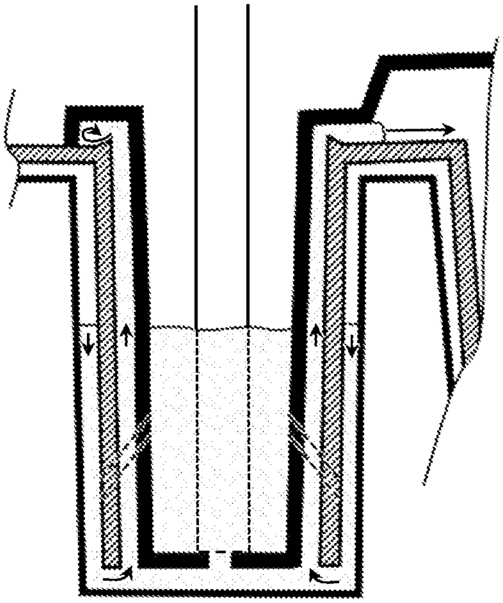
Figure 6C:
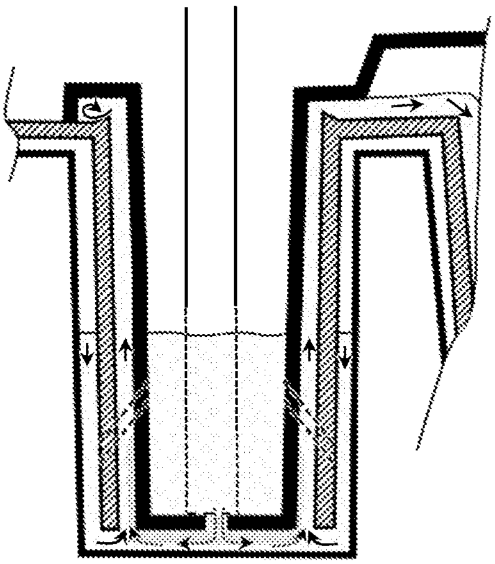

Next, processing liquid can be ejected from the conduits 110 by first injecting S70 the processing liquid in the conduits 110, e.g., using pipetting robots, and, this, while aspirating S60 some of the immersion liquid that has already filled the corresponding processing regions, owing to the negative pressure applied to the corresponding vacuum circuit, see FIGS. 6B-6C. Advantageously, the processing liquid can be ejected S50-S80 so as to be hydrodynamically confined in the immersion liquid in the processing regions, as illustrated by dotted arrows in FIG. 6C. This is made possible thanks to the coaxial, cylindrical (sandwich) structures 110-210-310 and corresponding apertures 111, 411, 511.

Figure 6D:
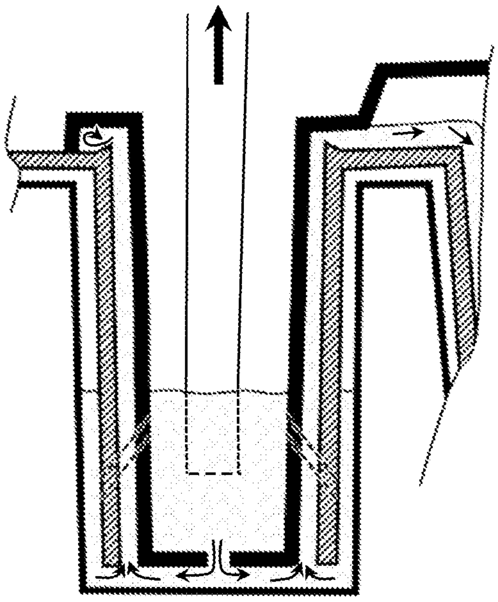

The HFC obtained may then possibly be maintained, passively (S80), even after retracting the pipettes 50, as illustrated in FIG. 6D. In that respect, the insert 10, 20 preferably includes an array of M×N reservoirs 212, as discussed earlier. As seen in FIG. 5, each reservoir is in fluid communication with a respective vacuum circuit sections 410, such that aspirating S60 immersion liquid causes to fill the M reservoirs 212 connected to the M sections 410 via the aspiration channel(s) 412. So, the HFC can be passively maintained from the moment that immersion liquid starts spilling into the reservoirs 212, even if the suction is stopped.

HFCs can be used with benefits, e.g., to obtain faster chemical reactions on surfaces due to enhanced convection and replenishment of chemicals and/or highly localized chemical reactions without mechanical boundaries. HFCs are well suited for biological/medical applications (processing under physiological conditions), as well as for scanning applications, and further allow precise gradients to be obtained. Accordingly, embodiments of the present invention make it possible to make HFC technology compatible with microtiter plates.

As said, the reservoirs preferably protrude from the average plane of the insert 10, 20, so as to be inserted S40 in corresponding wells 312 of the plate 30, while MFP conduits 110 are inserted in a distinct array of wells 310, the latter interlaced with the former.

The above embodiments have been succinctly described in reference to the accompanying drawings and may accommodate a number of variants. Several combinations of the above features may be contemplated. Examples are given in the next section.

2. Specific Embodiments

Particularly preferred embodiments involve a two-part, injection molded insert, which can be jointly operated with a correspondingly shaped microtiter plate to generate HFCs in every second row of the microtiter plate. The design proposed in FIGS. 1-2 is suitable for automation (e.g., compatible with standard pipetting robots), allows fast liquid switching, and does not require specific tubing. Such a design makes it possible to use a plunger-like connection, by merely pressing a connector (with a gasket) onto the vacuum ports. This connector may for instance be configured as a half-spherical stamp that has a hole, and which is connected to a vacuum source. Such connectors may notably be arranged on a bridge that is moved up and down for connecting/disconnecting. The insert is typically disposable, can be dimensioned so as to be compatible with standard microtiter plates. In addition, the top part 10 can be made transparent, so as to allow direct signal read-out from the top. Note, the bottom of the titer plate wells may also be transparent, to allow a read-out from the bottom.

After assembly (FIGS. 2A and 2B), in a leak-free manner, the two parts 10, 20 form individual, closed compartments. Each compartment includes at least a conduit 110 and a corresponding reservoir 212, communicating with the conduit 110 via a respective vacuum circuit section 410. In preferred embodiments, a compartment includes a full row of conduits 110, served by a common vacuum bar, and the corresponding reservoirs 212. Still, each the N vacuum circuit 410-415 includes M vacuum circuit sections 410 serving M conduits, hence the multiplex structure of the insert.

Leak-free assembly is achieved using laser-welding at the interface of the two parts 10, 20. Because the upper part is transparent, laser-welding can be performed directly at the interface of the two materials. A variety of transparent and non-transparent materials can be contemplated, which are compatible with laser transmission welding. Such materials will preferably be chosen from common thermoplastics (which can adequately be welded), including, e.g., nylon, polypropylene, polycarbonate, acrylonitrile butadiene styrene (ABS), polystyrene, polytetrafluoroethylene (PTFE), and poly(methyl methacrylate) (PMMA). Alternatively, ultrasonic welding, thermal welding or adhesives could be used to achieve a leak free assembly.

Looking at the system 10-30 as forming an M×2N array of N columns and M rows, MFP conduits are located in the first row of the array and then in every second row. Each MFP can be addressed individually using a pipetting system to inject chemicals of interest in the needed sequence and time for an assay. Every second row of the insert serves as waste reservoirs. The latter form part of the insert and each row of reservoirs has two common vacuum ports. The vacuum distribution channels can for instance extend above the rows of reservoirs 212, in the interest of optimizing the flow paths and the resulting compactness of the insert 10, 20.

During operation, a complete row of, e.g., 8 wells are processed simultaneously. The following describes the operation mechanism at the level of a single pair of conduit and reservoir. Immersion liquid is dispensed by the pipettor to fill the cup structures (e.g., 110, 250/250*a*, as illustrated in FIG. 6A). Then, a negative pressure is applied to the reservoir to initiate flow through an aspiration channel 412 towards the reservoir 212, FIG. 6B. Next, an HFC is formed over the processing surface of the corresponding well 310, e.g., by bringing the pipette 50 in contact with the orifice 111 to inject the processing liquid, see FIG. 6C. Finally, the HFC can be passively maintained also when the pipette 50 is removed and the processing surface continuously rinsed with immersion liquid, FIG. 6D.

The proposed design allows a passive exchange of immersion liquid from the inner region of the conduit 110 and the outer volume 510 defined by the overflow circuit section. This way, there is no need for the wells 310 to receive additional supply of immersion liquid, which would be difficult to achieve.

Figure 7A:
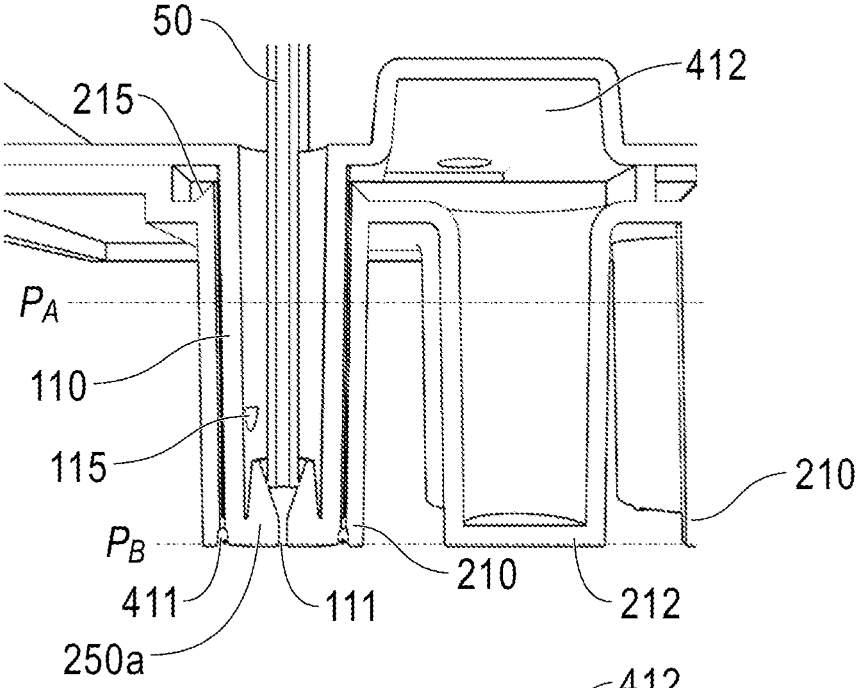
FIGS. 7A, 7B and 7C show 3D views of selected parts of the MFP insert (FIGS. 7A and 7B) and the MFP system (FIG. 7C), as in embodiments.
Figure 7B:
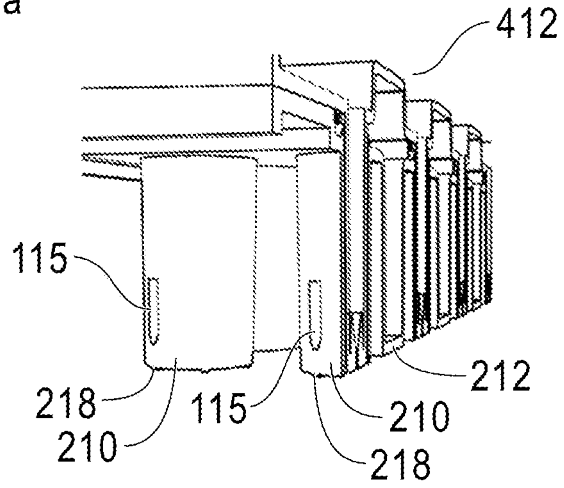
Figure 7C:
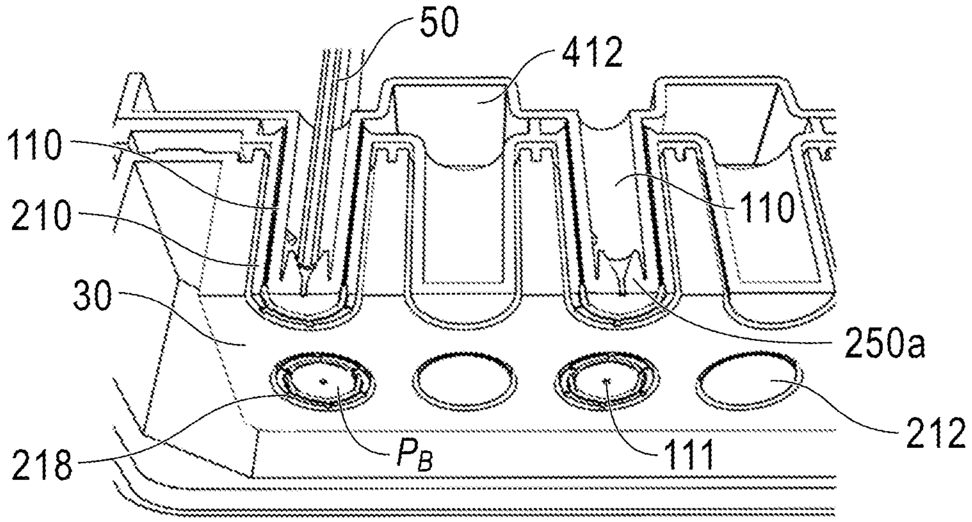

The conduits 110 are preferably terminated by liquid injection ports 250*a*, as shown in FIGS. 7A-7C, where such ports 250*a* can be suitable shaped to receive the pipettes, see FIG. 7A. The second tubular sections 210 that delimit the vacuum circuit sections 410 can be shaped to form a circular rim 215, e.g., a collar, to ensure a homogeneous flow distribution as needed to obtain a homogenous liquid flow for the HFC.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, various other materials can be contemplated for the parts 10 and 20.

What is claimed is:

1. A microfluidic probe insert comprising:

an array of M×N microfluidic probe conduits, the conduits including respective orifices in a bounding plane and extending, each, perpendicular to the bounding plane on one side thereof; and n vacuum circuits, each comprising at least one vacuum port and m openings in the bounding plane, where 2≤M, 2≤N, 1≤n≤M×N/m, and 2≤m≤M×N, wherein:

each vacuum circuit of the n vacuum circuits is configured to enable fluid communication between the respective at least one vacuum port and each of the m openings, and the insert is configured to enable fluid communication between each of the m openings and a respective one of m orifices of m conduits of the microfluidic probe conduits, on another side of the bounding plane, opposite to the one side.

2. The microfluidic probe insert according to claim 1, wherein:

the microfluidic probe conduits protrude, each, from an average plane of the insert, so as to be insertable in respective wells of a microtiter plate to allow liquid to be transferred from the microfluidic probe conduits to the respective wells, in operation of the microfluidic probe insert.

3. The microfluidic probe insert according to claim 2, wherein:

each vacuum circuit comprises m vacuum circuit sections;

each vacuum circuit section of the m vacuum circuit sections surrounds, at least partly, a respective conduit of the m conduits on the one side of the bounding plane and extends along the respective conduit up to a respective opening of the m openings of each vacuum circuit; and the respective opening surrounds, at least partly, a respective orifice of the respective conduit, so as to allow fluid communication between the respective orifice and the respective opening on the another side of the bounding plane.

4. The microfluidic probe insert according to claim 3, wherein the insert is structured to ensure a minimal gap between the bounding plane and a set of bottom walls of the wells of the microtiter plate, in operation, thereby allowing fluid communication between the respective orifice and the opening.

5. The microfluidic probe insert according to claim 4, wherein:

the array of microfluidic probe conduits forms a rectangular arrangement of M rows×N columns of conduits;

n=N;

m=M; and each vacuum circuit is associated with a respective one of the N columns of conduits to enable fluid communication between the respective at least one vacuum port and each of the M openings, wherein each of the M openings is in fluid communication with a respective one of the M orifices of the M conduits of the respective one of the N columns of conduits.

6. The microfluidic probe insert according to claim 5, wherein:

the microfluidic probe insert further includes an array of M×N reservoirs; and each reservoir of the M×N reservoirs extends on the one side of the bounding plane and is in fluid communication with a respective one of the M vacuum circuit sections of one of the N vacuum circuits, to be able to receive liquid aspirated via the respective one of the M vacuum circuit sections, in operation.

7. The microfluidic probe insert according to claim 1, wherein 4≤M and 6≤N.

8. The microfluidic probe insert according to claim 1, wherein each vacuum circuit comprises at least two vacuum ports, each in fluid communication with a respective set of m orifices.

9. A microfluidic probe system, comprising:

a microfluidic probe insert including:

an array of M×N microfluidic probe conduits, the conduits including respective orifices in a bounding plane and extending, each, perpendicular to the bounding plane on one side thereof; and N vacuum circuits, each comprising at least one vacuum port and M openings in the bounding plane, where 2≤M, 2≤N; and a microtiter plate comprising an array of at least M×N wells, wherein:

each vacuum circuit of the N vacuum circuits is configured to enable fluid communication between a respective at least one vacuum port and each of the M openings;

the insert is configured to enable fluid communication between each of the M openings and a respective one of M orifices of M conduits of the microfluidic probe conduits, on another side of the bounding plane, opposite to the one side; and the microfluidic probe conduits protrude, each, from an average plane of the insert, so as to be insertable in respective wells of the microtiter plate, in operation.

10. The microfluidic probe system according to claim 9, wherein:

each vacuum circuit comprises m vacuum circuit sections;

each vacuum circuit section of the m vacuum circuit sections surrounds, at least partly, a respective conduit of the m conduits on the one side of the bounding plane and extends along the respective conduit up to a respective opening of the m openings of each vacuum circuit; and the respective opening surrounds, at least partly, a respective orifice of the respective conduit, so as to allow fluid communication between the respective orifice and the respective opening on the another side of the bounding plane, in a processing region defined between the bounding plane and a bottom wall of a respective one of the wells.

11. The microfluidic probe system according to claim 10, wherein:

the M openings are first openings;

the microfluidic probe insert and the microtiter plate are jointly configured to form M×N overflow circuit sections upon inserting the microfluidic probe conduits into the respective wells, wherein each of the overflow circuit sections:

is bounded by a portion of a lower part of the insert and a portion of an upper surface of the microtiter plate;

surrounds, at least partly, a respective vacuum circuit section of the M vacuum circuit sections of one of the N vacuum circuits; and extends on the one side of the bounding plane up to a second opening on the bounding plane, the second opening surrounding, at least partly, a respective one of the first openings, thereby enabling fluid communication therewith in the processing region; and the microfluidic probe insert further includes M×N bypass channels, each connecting one of the M×N microfluidic probe conduits to a respective one of the M×N liquid overflow circuit sections through a respective one of the vacuum circuit sections.

12. The microfluidic probe system according to claim 11, wherein:

the microfluidic probe insert further includes an array of M×N reservoirs; and each reservoir of the M×N reservoirs extends on the one side of the bounding plane and is in fluid communication with a respective one of the M vacuum circuit sections of one of the N vacuum circuits, so as to be able to receive liquid aspirated via the respective one of the M vacuum circuit sections, in operation.

13. The microfluidic probe system according to claim 12, wherein:

the wells are first wells and the microtiter plate further comprises an additional array of M×N second wells, the second wells interlaced with the first wells, so as for the microtiter plate to form an array of M×2N wells; and each reservoir protrudes from an average plane of the insert, so as to be insertable in the second wells of the microtiter plate, in operation.

* * * * *